United States Patent
Krueger et al.

(10) Patent No.: US 9,651,179 B2
(45) Date of Patent: May 16, 2017

(54) PROFILE CLAMP

(71) Applicant: NORMA GERMANY GMBH, Maintal (DE)

(72) Inventors: Manfred Krueger, Buedingen (DE); Stephan Mann, Biebergemuend (DE); Achim Kamp, Langenselbold (DE)

(73) Assignee: NORMA GERMANY GMBH, Maintal (DE)

( * ) Notice: Subject to any disclaimer, the term of this patent is extended or adjusted under 35 U.S.C. 154(b) by 851 days.

(21) Appl. No.: 13/865,600

(22) Filed: Apr. 18, 2013

(65) Prior Publication Data

US 2013/0291346 A1 Nov. 7, 2013

(30) Foreign Application Priority Data

May 2, 2012 (DE) .................. 10 2012 009 256

(51) Int. Cl.
*F16L 23/00* (2006.01)
*F16L 23/08* (2006.01)
*F16L 33/04* (2006.01)
*F01N 13/18* (2010.01)

(52) U.S. Cl.
CPC .......... *F16L 33/04* (2013.01); *F01N 13/1805* (2013.01); *F16L 23/08* (2013.01); *F01N 2450/18* (2013.01); *Y10T 24/1451* (2015.01); *Y10T 29/49947* (2015.01)

(58) Field of Classification Search
CPC ........ F16L 33/04; F16L 23/08; F01N 13/1805
USPC .......................................................... 24/284
See application file for complete search history.

(56) References Cited

U.S. PATENT DOCUMENTS

| 847,620 | A | * | 3/1907 | Thompson | F16L 33/04 |
| | | | | | 24/284 |
| 1,205,926 | A | * | 11/1916 | Palmer et al. | F16L 33/04 |
| | | | | | 24/275 |
| 1,568,043 | A | * | 1/1926 | Anderson | F16D 65/04 |
| | | | | | 188/249 |

(Continued)

FOREIGN PATENT DOCUMENTS

| CN | 101251212 | 8/2008 |
| DE | 198 00 283 | 7/1990 |

(Continued)

OTHER PUBLICATIONS

Korean office action dated Jan. 30, 2015, along with an english translation thereof, issued in KR 10-2013-0049023 counterpart application (6 pages).

(Continued)

*Primary Examiner* — Robert J Sandy
*Assistant Examiner* — Jason W San
(74) *Attorney, Agent, or Firm* — Greenblum & Bernstein, P.L.C.

(57) ABSTRACT

Profile clamp has a base and flanks facing radially inwards. The clamp utilizes a tensioning device that connects two ends of the clamp band to one another. The clamp band has in a circumferential direction at least a first part and a second part. The first part has in at least one of its flanks a first connection geometry and the second part in at least one of its flanks has a second connection geometry. The first connection geometry and the second connection geometry are engagable with one another.

16 Claims, 2 Drawing Sheets

(56) References Cited

U.S. PATENT DOCUMENTS

| | | | | |
|---|---|---|---|---|
| 3,014,259 A | * | 12/1961 | Joseph | F16L 3/1008 24/284 |
| 3,129,021 A | * | 4/1964 | Willis | F16L 27/1133 277/616 |
| 3,132,402 A | * | 5/1964 | Joseph | F16L 23/08 24/16 R |
| 3,258,822 A | * | 7/1966 | Schlesch | F16L 41/06 138/99 |
| 3,432,188 A | * | 3/1969 | Turner | F16L 33/08 112/80.07 |
| 3,464,722 A | * | 9/1969 | Larkin | F16L 23/10 24/284 |
| 3,748,703 A | * | 7/1973 | Maillocheau | F16B 45/00 24/265 H |
| 4,373,235 A | * | 2/1983 | Korgaonkar | F16L 23/04 24/282 |
| 4,611,839 A | * | 9/1986 | Rung | F16L 17/04 24/279 |
| 4,896,902 A | * | 1/1990 | Weston | F16L 17/04 285/112 |
| 4,915,418 A | * | 4/1990 | Palatchy | F16L 17/04 24/284 |
| 4,940,261 A | * | 7/1990 | Somers Vine | F16L 23/08 285/112 |
| 5,018,768 A | * | 5/1991 | Palatchy | F16L 17/04 24/284 |
| 5,246,257 A | * | 9/1993 | Kojima | F16L 21/06 285/112 |
| 5,752,296 A | * | 5/1998 | Chaput | H01R 13/635 24/268 |
| 6,076,861 A | * | 6/2000 | Ikeda | F16L 21/06 285/112 |
| 6,139,069 A | * | 10/2000 | Radzik | F16L 17/04 285/112 |
| 6,383,315 B1 | | 5/2002 | Kreipe | |
| 8,365,366 B2 | * | 2/2013 | Fouqueray | F16L 23/08 24/20 EE |
| 2008/0197627 A1 | * | 8/2008 | Baudoin | F16L 23/08 285/330 |
| 2009/0091125 A1 | | 4/2009 | Takeda | |
| 2009/0119886 A1 | | 5/2009 | Werth | |
| 2010/0037435 A1 | * | 2/2010 | Fouqueray | F16L 23/08 24/19 |
| 2013/0111708 A1 | * | 5/2013 | Wachter | F16L 23/08 24/19 |
| 2013/0212842 A1 | * | 8/2013 | Rigollet | F16L 23/08 24/461 |

FOREIGN PATENT DOCUMENTS

| | | |
|---|---|---|
| DE | 198 00 283 | 7/1999 |
| GB | 1 331 569 | 9/1973 |
| GB | 2 338 526 | 12/1999 |
| JP | 49-45421 | 4/1974 |
| JP | 57-100692 | 6/1982 |
| JP | 9-159086 | 6/1997 |
| JP | 2001-519016 | 10/2001 |
| JP | 2006-144871 | 6/2006 |
| KR | 20-1990-0006899 | 4/1990 |
| KR | 10-2001-0005733 | 1/2001 |
| KR | 10-2013-0053023 | 6/2004 |
| WO | WO 98/43010 | 10/1998 |

OTHER PUBLICATIONS

Japan Office action, dated Mar. 4, 2014 along with an english translation thereof.

German office action issued in 10 2012 009 256.3 counterpart application.

Chinese office action issued in 201310154169.8 counterpart application.

Korean office action, along with an english translation thereof, issued in KR 10-2013-0049023 counterpart application.

Chinese office action dated Aug. 5, 2015, along with an english translation thereof, issued in CN 201310154169.8 counterpart application.

Korean office action dated Jun. 2, 2015, along with an english translation thereof, issued in KR 10-2013-0049023 counterpart application (8 pages).

* cited by examiner

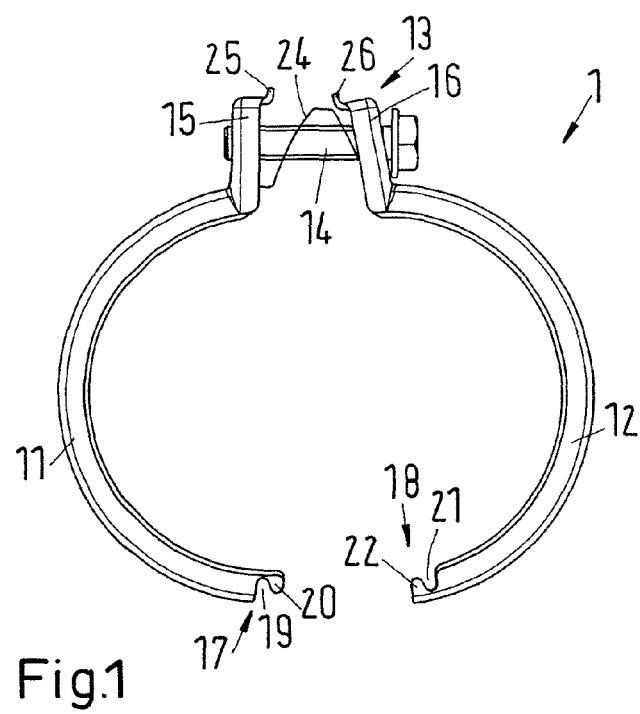
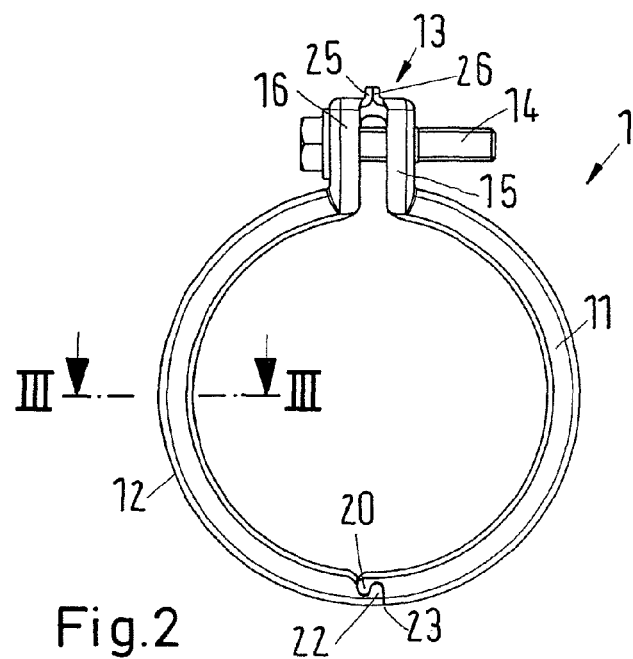
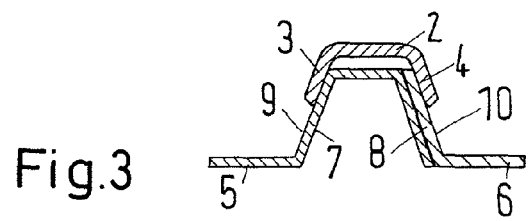
Fig.1
Fig.2
Fig.3

PROFILE CLAMP

CROSS-REFERENCE TO RELATED APPLICATIONS

The present application claims priority under 35 U.S.C. §119 of German Patent Application No. 102012009256.3, filed May 2, 2012, the disclosure of which is expressly incorporated by reference herein in its entirety.

BACKGROUND OF THE INVENTION

1. Field of the Invention

The invention relates to a profile clamp utilizing a clamp band, and which has a base and flanks facing radially inwards. A tensioning device connects two ends of the clamp band to one another. The clamp band has, in a circumferential direction, at least a first part and a second part.

2. Discussion of Background Information

An example of a profile clamp of this type is disclosed DE 198 00 283 C1 and serves to connect two pipes or pipe sections. The two pipe sections have on their ends (which are to be connected) flanges that protrude radially outwards. These flanges have on their back sides (facing away from one another) sloped surfaces, i.e., so-called conical or tapered surfaces. When the profile clamp is tightened, the flanks act on the conical surfaces and push the two pipe sections towards one another. When the profile clamp is completely tightened, the two pipe sections bear against one another with a predefined force. A connection of this type is also referred to as a "coned flange connection".

In order to mount the profile clamp, it must be widened far enough so that the flanks can be guided over the projections on the pipe ends. For this purpose, the clamp band can, for example, be bent open (if it is embodied as a continuous member) in a circumferential direction between the tensioning device.

Another solution is suggested in DE 198 00 283 C1 (mentioned above). Here, the clamp band is subdivided in a circumferential direction into two parts. In order to connect the two parts, two tensioning devices are utilized and are, for example, arranged in a diametrically opposing manner.

This profile clamp has in principle proven itself. However, care must be taken during the mounting to ensure that both tensioning devices are activated in order to correctly mount the profile clamp.

Another solution provides for the two parts of the clamp band to be connected to one another by means of a joint. In this type of joint, a hook on one part is hung into an accommodation provided therefor on the other part. This requires, in the normal case, a widening on the end of a part. The transition region is thus interrupted and the clamp band cannot optimally cover the projections or flanges of the pipes in this position. Lower axial forces can be the result. Furthermore, the danger exists that, during use, the joint becomes a weak point which can lead to failure under corresponding stressing.

SUMMARY OF THE INVENTION

The invention provides a solution to one or more of the deficiencies noted above and allows for the mounting of a profile clamp in a more simple manner.

Thus, the invention provides for a profile clamp of the type described above except that the first part has in at least one of its flanks a first connection geometry and the second part has in at least one of its flanks a second connection geometry, wherein the first connection geometry and the second connection geometry are engagable with one another.

With this embodiment, one can more easily mount the profile clamp.

Before mounting the clamp, the first part and the second part need only be connected to one another by a tensioning device. Apart from that, there is a gap between the two parts, such that the two parts can be, for example, angled against one another in order to guide them past the flanges on the pipe ends. Once the parts of the profile clamp are located on the circumference of the flanges, the first connection geometry and the second connection geometry can be engaged with one another. For this purpose, the first connection geometry and the second connection geometry are preferably matched to one another, that is, the flanks of the first part and of the second part form, in the region of the connection geometries, a closed or virtually closed surface when the connection geometries are engaged with one another. Once this engagement has been produced or has occurred, the first part and the second part are sufficiently connected to one another in order to be able to accommodate the necessary tensile forces required during a tightening of the tensioning device. Once the tension of the profile clamp necessary for the connecting of the two pipes has been produced, the engagement of the connection geometries can no longer be released, because a movement required for this is no longer possible. In an axial direction (in relation to the pipes being connected), a movement of the two connection geometries relative to one another is not possible, because the two flanks (together with the projections on the pipe ends) prevent a movement of this type. In another direction, a movement of the two connection geometries relative to one another is likewise no longer possible, because the tensioning device has reduced the diameter of the profile clamp to a sufficient extent.

Preferably, the first part has, in its two flanks, a first connection geometry and the second part has, in its two flanks, a second connection geometry. Thus, a connection between the first part and the second part is produced on both sides of the projections of the pipe ends, which increases the transferable tension forces. Also, the coned flange connection becomes stable to an even better degree. Here, it is preferred that the connection geometries in both flanks of each part be embodied identically. The same movement is thus required for both flanks in order to engage the first connection geometry and the second connection geometry with one another. This further facilitates the mounting.

Preferably, when in a mounted state, the base of the first part and the base of the second part bear against one another. Alternatively, there can be, between the base of the first part and the base of the second part, a gap formed which is maximally as large as a radial thickness of the base. In this case, the projections or coned flanges on the pipe ends are substantially covered over the entire circumference, possibly with exception of a region of the tensioning device. It can thus be ensured that, a thermal impingement of the profile clamp (as in the case of a profile clamp for an exhaust line of a motor vehicle with combustion engine) is problems free. A small gap between the base of the first part and the base of the second part would result in no harm.

Preferably, the connection geometries are arranged exclusively in the flanks. The base is thus continuously retained, i.e., its integrity is maintained,—if the gap at the point of impact between the first part and the second part in a mounted clamp is disregarded. This further increases the possible tension forces that can be applied or resisted and therefore also the stability of the coned flange connection.

Preferably, the first connection geometry has a recess opening radially outwards, with which the second connection geometry is engagable. The second connection geometry therefore need only be inserted into the first connection geometry from the radial outside in order to produce an engagement. This is a relatively simple step, which can be accomplished by a technician without difficulty.

Here, it is preferred that a projection facing radially outwards is attached in a circumferential direction to the recess opening radially outwards. This projection can then enter into a corresponding recess in the second connection geometry, such that a positive fit or engagement between the flanks of the first part and second part can be produced.

Alternatively or additionally, it can be provided that the second connection geometry has a recess opening radially inwards, with which the first connection geometry is engagable. In this case, the same applies as for the previously described embodiments, with the difference that the movement must proceed in the opposite direction in order to engage the two connection geometries with one another. The second connection geometry is then simply hooked into the first connection geometry from the radial outside.

Preferably, a projection facing radially inwards is attached in a circumferential direction to the recess opening radially inwards. This projection can then enter into a corresponding recess on the first connection geometry.

Preferably, a tensioning device has in a radial direction an allowance which is at least as large as a radial movement for the production of the engagement between the two connection geometries. If the two connection geometries are to be engaged with one another, they are moved radially to one another. This radial movement is possible because the tensioning device still allows this movement before the final firm tightening of the profile clamp.

Preferably, the tensioning device has on each end of the clamp band a bracket, wherein a tensioning element is guided through both brackets and a compression spring is arranged between the brackets. The compression spring then retains the two brackets and thus the first part and the second part of the clamp band with a certain distance to one another, such that it is easier for the technician to guide the profile clamp over the projections or coned flanges on the pipe ends in an untightened state. The compression spring can, however, be compressed during tightening such that it does not impede the tightening.

Here, it is preferred that the compression spring interacts with alignment geometries on the brackets. For this purpose, the compression spring can, at least on its ends, for example have a cross section of the type of a polygon which enters accordingly into recesses of the type of a polygon on the brackets. For example, each bracket can have a square or rectangular cavity. Through these alignment geometries, it is ensured that, even in the unmounted state, the first part and the second part have a predefined alignment to one another. This facilitates the mounting.

The invention also provides for a profile clamp comprising a first part having a base and flanks and a second part having a base and flanks. A tensioning device is configured to connect ends of the first and second parts to one another. The first connection geometry is arranged on at least one of the flanks of the first part. A second connection geometry is arranged on at least one of the flanks of the second part. The first connection geometry and the second connection geometry are engagable with one another.

Each flank of the first part can comprises the first connection geometry and each flank of the second part can comprises the second connection geometry.

The first connection geometry can have a configuration that is identical to the second connection geometry.

The base of the first part and the base of the second part can have ends that one of: bear against one another when the clamp is in a mounted state, are spaced from each other via have a gap, and are spaced apart by a gap that is no more than a radial thickness of the base.

The first and second connection geometries can be arranged only in said flanks.

The first connection geometry can have a recess that opens radially outwardly so as to engage with a portion of the second connection geometry.

The first connection geometry may further comprise a projection facing radially outwardly and being coupled to, in a circumferential direction, the recess.

The second connection geometry can have a recess that opens radially outwardly so as to engage with a portion of the first connection geometry.

The second connection geometry may further comprise a projection facing radially outwardly and being coupled to, in a circumferential direction, the recess.

The tensioning device may be structured and arranged to allow radial movement of the first and second parts by an amount that is sufficient to allow for engagement between the first and second connection geometries.

The ends of first and second parts each comprise a bracket, and wherein the tensioning device may further comprise a tensioning element that can extend through the brackets and a compression spring is arranged between the brackets.

The compression spring may be sized and configured to align the brackets with one another.

The invention also provides for a method of connecting together two pipe ends comprising arranging the profile clamp of claim 1 over ends of the pipes, engaging with one another the first and second connection geometries, and tightening the profile clamp.

The invention also provides for a profile clamp comprising a first C-shaped clamping section having a base and flanks and a second C-shaped clamping section having a base and flanks. A tensioning element is configured to connect ends of the first and second parts to one another. A first connection geometry is arranged on at least one of the flanks of the first part and being located on an opposite end of the first part. A second connection geometry is arranged on at least one of the flanks of the second part and being located on an opposite end of the second part. The first connection geometry and the second connection geometry are releasably engagable with one another.

Each flank of the first part may comprise the first connection geometry and each flank of the second part may comprise the second connection geometry.

The first connection geometry may have a configuration that is identical to the second connection geometry.

The base of the first part and the base of the second part may have ends that one of bear against one another when the clamp is in a mounted state, are spaced from each other via have a gap, and are spaced apart by a gap that is no more than a radial thickness of the base.

The first and second connection geometries may be arranged only in said flanks.

The first connection geometry may have a recess that opens radially outwardly so as to engage with a portion of the second connection geometry.

The invention also provides for a method of connecting together two pipe ends comprising arranging the profile clamp of claim 14 over ends of the pipes, engaging with one another the first and second connection geometries, and tightening the profile clamp.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 shows a profile clamp in an unmounted state;

FIG. 2 shows a profile clamp in a mounted state;

FIG. 3 shows a cross section of according to FIG. 2; and

DETAILED DESCRIPTION OF THE PRESENT INVENTION

Figure 4:
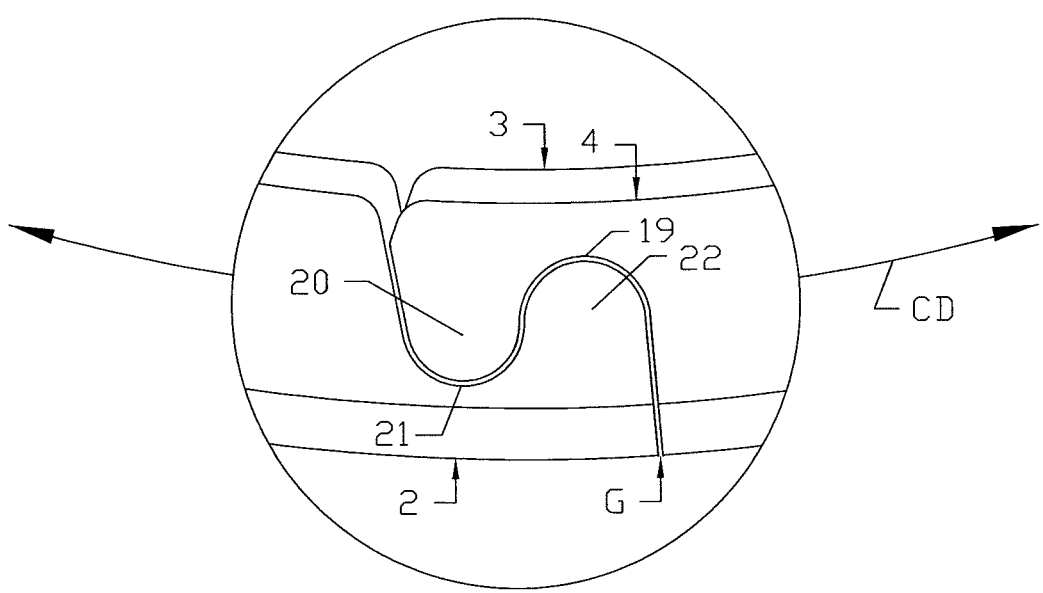
FIG. 4 shows an enlarged portion of FIG. 3 illustrating in detail a region of the first and second connecting geometries.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In the embodiment of FIGS. 1-3, there is shows a profile clamp 1 that utilizes a clamp band having a base 2 and two flanks 3, 4 facing radially inwards. The flanks 3, 4 are arranged to oppose and sloped away from one another, such that they roughly form the shape of a trapezoid in cross-section (see FIG. 3). A profile clamp 1 of this type can be used, for example, to form a so-called coned flange connection.

In a coned flange connection as shown in FIG. 3, two pipes 5, 6 can be connected to one another which have respectively projections 7, 8 facing radially outwards. The projections 7, 8 have on their back sides (pointing away from one another) conically sloped contact surfaces 9, 10, on which the two flanks 3, 4 of the profile clamp 1 can engage or contact. When the profile clamp 1 is tightened, then the clamp band is reduced in diameter such that the base 2 increasingly moves toward or approaches the projections 7, 8. During this tightening movement, the flanks 3, 4 intensify their pressure on the contact surfaces 9, 10, such that the projections 7, 8 are forced against one another by a predetermined tension force.

In another embodiment, the projections 7, 8 can be embodied in a solid manner and can be, on their front faces facing one another, aligned perpendicularly to an axis of the pipes 5, 6. The use or operation of the profile clamp 1 would be analogous.

Referring back to FIGS. 1-3, one should appreciate that prior to the mounting, the profile clamp 1 must be able to be opened far enough so that the flanks 3, 4 can be guided past the projections 7, 8.

Achieving this in a simple manner can occur because the profile clamp 1 has a first part 11 and a second part 12. The first part 11 and the second part 12 are connected to one another by a tensioning device 13. In the present case, the tensioning device can have the form of a screw 14 which is guided through a first bracket 15 on the first part and a second bracket 16 on the second part. The screw 14 is connected to an inside thread in the bracket 15. An additional nut, which bears against the bracket 15 of the first part 11 from the outside, can, however, also alternatively or additionally be provided.

The first part 11 has a first connection geometry 17 which is arranged roughly diametrically opposed to the tensioning device 13. The second part 12 similarly has a second connection geometry 18 which is likewise arranged roughly diametrically opposed to the tensioning device 13.

The first connection geometry 17 is exclusively arranged in the two flanks 3, 4 of the first part 11, and therefore is not arranged in the base 2 of the first part 11. The base 2 of the first part 11 can thus be made continuous.

The second connection geometry 18 is likewise only arranged in the flanks 3, 4 of the second part 12. The base 2 of the second part 12 is therefore also made continuous, unchanged, unmodified or preserved.

In both the first part 11 and also in the second part 12, the connection geometries 17, 18 in the flanks 3, 4 can be embodied with identical configurations. This is apparent when one compares the connection geometries 17, 18 in the flank 3 shown FIG. 1 with the configuration shown in FIG. 2 showing the connection geometries 17, 18 of the other flank 4.

The first connection geometry 17 has a recess 19 opening radially outwards, to which a projection 20 facing radially outwards is attached in a circumferential direction. The transitions between the flank 3, the recess 19 and the projection 20 can be embodied in a rounded manner, that is, sharp edges are avoided or not utilized.

The second connection geometry 18 similarly has a recess 21 opening radially inwards, to which a projection 22 facing radially inwards is attached in a circumferential direction.

The two connection geometries 17, 18 are matched to one another, that is, the projection 20 on the first part 11 fits exactly into the recess 21 on the second part 12, and the projection 22 on the second part 12 fits exactly into the recess 19 on the first part 11.

When the two parts 11, 12 have been placed around the pipes 5, 6, an engagement between the two connection geometries 17, 18 can be formed by a relatively simple movement. This movement involves moving the projection 22 on the second part 12 over the recess 19 on the first part 11 and then moving the second part 12 radially with respect to the first part 11 such that the projection 22 can enter into the recess 19. In this movement, the projection 20 then simultaneously enters into the recess 21.

A radial movement of this type between the two parts 11, 12 of the profile clamp 1 is possible because the tensioning device 13 permits this movement. For this purpose, it is only necessary that, for example, the bracket 16 arranged on the second part include a slotted hole opening that receives therein the screw 14.

Once the two connection geometries 17, 18 have been engaged with one another, there results a situation as it is illustrated in FIG. 2—which provides for a completely mounted profile clamp 1. It can easily be recognized that the projection 22 has entered into the recess 19 and the projection 20 into the recess 21.

Once the engagement has been produced and the two flanks 3, 4 have come to bear against the contact surfaces 9, 10 of the projections 7, 8, the engagement between the two connection geometries 17, 18 can essentially no longer be released without difficulty. A movement of the two parts 11, 12 relative to one another in an axial direction of the pipes 5, 6 is not possible, because such movement is prevented by the projections 7, 8. Accordingly, the two connection geometries 17, 18 in the flanks 3, 4 of the two parts 11, 12 cannot be and/or are prevented from being disengaged in an axial direction.

Once the profile clamp 1 is tightened, further movement of the two parts 11, 12 in a radial direction is also no longer possible such that, in this manner, the engagement of the two connection geometries 17, 18 can likewise no longer be released.

As it is, the engagement also cannot be released in a circumferential direction. Here, the engagement is embodied such that it can accommodate the forces occurring during the tightening between the two parts 11, 12 without difficulty.

In the mounted state, there results between the two parts 11, 12 of the profile clamp a point of impact 23, in which the base 2 of the part 11 is arranged very tightly on or against the base 2 of the part 12. In the ideal case, there results here a light contact. However, a small gap is also permissible which favorably should not be larger in a circumferential direction than the thickness of the base 2 in a radial direction. Accordingly, there is essentially no region on which the projections 7, 8 are not covered by the base 2 in a circumferential direction,—if the region of the tensioning device 13 can be disregarded. Accordingly, any heat radiation in a circumferential direction can, for example, be kept very uniform.

A compression spring 24 can optionally be arranged between the two brackets 15, 16. As long as the two connection geometries 17, 18 have not been engaged with one another, the compression spring 24 can retain the two parts 11, 12 at a certain distance from one another.

The compression spring 24 interacts with alignment geometries on the brackets 15, 16 such that the two parts 11, 12 are retained in a predetermined alignment relative to one another. This alignment can of course be released when external forces are removed.

The alignment geometries can be produced in a simple manner, for example, by utilizing a compression spring 24 that has on its ends a particular geometry, for example, a polygon, in particular a rectangle, and the brackets 15, 16 can have on their ends facing one another a correspondingly embodied geometry, for example a recess of the type that is comparable to the polygon, into which the compression spring 24 enters. Other possibilities for the alignment of the two parts 11, 12 of the profile clamp are, of course, possible.

The two brackets 15, 16 also have on their radially outer ends stops 25, 26 which, n the tightened state of the profile clamp 1 shown in FIG. 2 can come to bear against one another and provide an indication that a tightened state has been achieved.

As should be apparent from FIGS. 1-4, the first and second connecting geometries can be located on the parts 11 and 12 only on the ends opposite the ends having the brackets 15 and 16 and exclusively in the flanks 3 and 4. When viewed in FIG. 3, if one imposes an imaginary vertical plane (not shown) bisecting (passing through a center) the base 2 in a thickness direction, this imaginary plane would be spaced from the flanks 3 and 4 and would not intersect the first and second connecting geometries—owing to the fact that the connecting geometries are located exclusively in the flanks 3 and 4 in FIG. 3. Furthermore, as is apparent from FIG. 4, one can discern that with the first and second connecting geometries being connected, a gap G can exist between ends of part bases 2. Moreover, one can also discern that the projection 22 and recess 21 of one part face or are oriented radially inwardly relative to a circumferential direction CD and has a complementary shape to the projection 20 and recess 19 of the other part, which face or are oriented radially outwardly relative to a circumferential direction CD.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A profile clamp comprising:
   a first part having a base and flanks;
   a second part having a base and flanks;
   a tensioning device configured to connect ends of the first and second parts to one another;
   a first connection geometry arranged on the first part;
   a second connection geometry arranged on the second part; and
   the first connection geometry and the second connection geometry being engagable with one another so as to connect opposite ends of the first and second parts to one another,
   wherein the first connection geometry is formed exclusively within each flank of the first part and the second connection geometry is formed exclusively within each flank of the second part, whereby the bases of the first and second parts are continuous and free of connection geometries, and
   wherein the first connection geometry has a recess that opens radially outwardly relative to a circumferential direction of the profile clamp so as to engage with a portion of the second connection geometry.

2. The profile clamp of claim 1, wherein the first connection geometry has a configuration that is complementary to the second connection geometry.

3. The profile clamp of claim 1, wherein the base of the first part and the base of the second part have ends that one of:
   bear against one another when the clamp is in a mounted state;
   are spaced from each other via a gap; and
   are spaced apart by a gap that is no more than a radial thickness of the base.

4. The profile clamp of claim 1, wherein the first connection geometry further comprises a projection facing radially outwardly and being coupled to, in the circumferential direction, the recess.

5. The profile clamp of claim 1, wherein the second connection geometry has a recess that opens radially inwardly relative to the circumferential direction of the profile clamp so as to engage with a portion of the first connection geometry.

6. The profile clamp of claim 5, wherein the second connection geometry further comprises a projection facing radially inwardly relative to the circumferential direction of the profile clamp and being coupled to, in the circumferential direction, the recess of the first connection geometry.

7. The profile clamp of claim 1, wherein the tensioning device is structured and arranged to allow radial movement of the first and second parts by an amount that is sufficient to allow for engagement between the first and second connection geometries.

8. The profile clamp of claim 1, wherein the ends of first and second parts each comprise a bracket, and wherein the tensioning device further comprises:
   a tensioning element that can extend through the brackets; and
   a compression spring is arranged between the brackets.

9. The profile clamp of claim 8, wherein the compression spring is sized and configured to align the brackets with one another.

10. A method of connecting together two pipe ends comprising:
    arranging the profile clamp of claim 1 over ends of the pipes;
    engaging with one another the first and second connection geometries; and
    tightening the profile clamp.

11. A profile clamp comprising:
    a first C-shaped clamping part having a base and flanks extending radially inward from the base;
    a second C-shaped clamping part having a base and flanks extending radially inward from the base;
    a tensioning element configured to connect ends of the first and second C-shaped clamping parts to one another;
    a first connection geometry arranged on the first C-shaped clamping part and being located on an opposite end of the first C-shaped clamping part;
    a second connection geometry arranged on the second C-shaped clamping part and being located on an opposite end of the second C-shaped clamping part; and
    the first connection geometry and the second connection geometry being releasably engagable with one another,
    wherein the first connection geometry is formed exclusively within each flank of the first C-shaped clamping part and the second connection geometry is formed exclusively within each flank of the second C-shaped clamping part,
    wherein the first and second connection geometries are located radially inward with respect to each base,
    wherein an imaginary plane passing through a center of each said base in a base thickness direction does not intersect the first and second connection geometries, and
    wherein the first connection geometry has a recess that opens radially outwardly relative to a circumferential direction of the profile clamp so as to engage with a portion of the second connection geometry.

12. The profile clamp of claim 11, wherein the first connection geometry has a configuration that is complementary to the second connection geometry.

13. The profile clamp of claim 11, wherein the base of the first C-shaped clamping part and the base of the second C-shaped clamping part have ends that one of:
    bear against one another when the clamp is in a mounted state;
    are spaced from each other via a gap; and
    are spaced apart by a gap that is no more than a radial thickness of the base.

14. A method of connecting together two pipe ends comprising:
    arranging the profile clamp of claim 11 over ends of the pipes;
    engaging with one another the first and second connection geometries; and
    tightening the profile clamp via the tensioning element.

15. A profile clamp for connecting together ends of pipes, comprising:
    a first C-shaped part comprising:
       a connecting end;
       a base; and
       two spaced-apart radially inwardly oriented diverging flanks integrally formed with the base and extending to an opposite connecting end;
    a second C-shaped part comprising:
       a connecting end;
       a base; and
       two spaced-apart radially inwardly oriented diverging flanks integrally formed with the base and extending to an opposite connecting end;
    a tensioning device configured to connect the connecting ends of the first and second parts to one another;
    a first connection geometry located radially inward of the base and arranged on each of the two diverging flanks of the opposite connecting end of the first part;
    a second connection geometry located radially inward of the base and arranged on each of the two diverging flanks of the opposite connecting end of the second part;
    the first connection geometry and the second connection geometry being engagable with one another,
    wherein the profile clamp is installable on the ends of the pipes so that the two diverging flanks contact tapered contact surfaces of the pipe ends,
    wherein an imaginary plane passing through a center of each said base in a base thickness direction does not intersect the first and second connection geometries, and
    wherein the first connection geometry has a recess that opens radially outwardly relative to a circumferential direction of the profile clamp so as to engage with a projection of the second connection geometry that extend radially inwardly relative to the circumferential direction.

16. The profile clamp of claim 15, wherein:
    the first connection geometry comprises the recess and a projection; and
    the second connection geometry comprises a recess and the projection.

* * * * *